United States Patent [19]
Knigge

[11] Patent Number: 5,195,360
[45] Date of Patent: Mar. 23, 1993

[54] APPARATUS AND METHODS FOR TESTING DOUBLE PACKAGES

[75] Inventor: Wayne I. Knigge, Maple Grove, Minn.

[73] Assignee: General Mills, Inc., Minneapolis, Minn.

[21] Appl. No.: 596,795

[22] Filed: Oct. 12, 1990

[51] Int. Cl.$^5$ ............................................. G01M 3/36
[52] U.S. Cl. .......................................... 73/49.3; 73/52
[58] Field of Search ................................. 73/49.3, 52

[56] References Cited

U.S. PATENT DOCUMENTS

| | | | |
|---|---|---|---|
| 4,517,827 | 5/1985 | Tapscott | 73/49.3 |
| 4,649,740 | 5/1987 | Franklin | 73/49.3 |
| 4,671,101 | 6/1987 | Franklin | 73/49.3 |
| 4,862,732 | 9/1990 | Raymond et al. | 73/49.3 |
| 4,899,574 | 2/1990 | Potteiger | 73/49.3 |
| 4,955,226 | 9/1990 | Beaty et al. | 73/49.3 |

FOREIGN PATENT DOCUMENTS 2196130  4/1988  United Kingdom ................. 73/52

*Primary Examiner*—Hezron E. Williams
*Assistant Examiner*—Michael Brock
*Attorney, Agent, or Firm*—John A. O'Toole

[57] ABSTRACT

A method of testing for and detecting defective liners (12) enclosed within a carton (14) of a double package is disclosed utilizing an apparatus (10) including a pressure plate (16) which rests upon the liner (12), with gravity acting on the pressure plate (16) placing pressure on the liner (12). The extent that the liner (12) deflects under the pressure of the pressure plate (16) can be detected such as by the use of a magnetic sensor (72), with the liner (12) deflecting a greater extent when the liners (12) are improperly sealed allowing escape of the trapped air from the liner (12). In the preferred form, the pressure plate (16) is slideably mounted to a carriage (18) which is reciprocated between a first, lower position and a second, upper position by a crank arm assembly (32). In the first, lower position, the carriage (18) is adjacent to the double package with the pressure plate (16) extending through the open top of the carton (14) and resting upon the liner (12). In the second, upper position, the carriage (18) and the pressure plate (16) are elevated above the liner (12) and the open top of the carton (14). In the preferred form, the carriage (18) is raised by an upward force created by a cam (34) which rocks first and second crank arms (36, 48) and is lowered by removing the upward force and allowing the carriage (18) to fall under gravitational forces to the first, lower position by rotation of the cam (34).

24 Claims, 2 Drawing Sheets

APPARATUS AND METHODS FOR TESTING DOUBLE PACKAGES

BACKGROUND

The present invention generally relates to apparatus and methods for testing packages, particularly to apparatus and methods for testing double packages, and more particularly to apparatus and methods for testing sealed liners of double packages.

A common method of packaging cereals, especially Ready-to-Eat cereals, and other foodstuffs is a double package comprising a sealed liner enclosed within a carton. In the past, such liners were formed of glassine or wax paper. However, the use of plastic liners has been increasing because of the advantages obtained thereover. Specifically, plastic liners provide a better moisture seal to the food stuffs being packaged providing extended freshness without staleness. Additionally, plastic liners have a greater tendency to prevent tearing or ripping during manufacturing. A further benefit obtained is that the liner is more consumer friendly allowing the liner to be opened without tearing or ripping and allowing the liner to be resealed by the consumer to preserve freshness. Further, the cost of plastic liners tends to be relatively less than the cost of prior glassine or wax paper liners.

However, one difference between plastic and prior glassine liners is that plastic is structurally more flimsy and has a greater tendency to collapse. Collapse of the liner may disrupt the proper functioning of the remaining packaging operations including but not limited to the filling of foodstuffs into the liner, the dropping of coupons or premiums inside of the liner, closing and sealing the liner, and like operations.

One major source of consumer complaints in the packaging of cereal and other foodstuffs is improperly sealed liners of double packages. Specifically, improperly sealed liners may result in the foodstuff going stale as the result of entrance of moisture into the liner. Even small holes or seal defects can result over time in product going stale prematurely. More serious in terms of consumer perception is a visually apparent opening which can result in the erroneous suspicion of a tampered product. The most prevalent defect in sealing of the liners is an improper sealing of the top of the liner. The collapse of the liner either during forming of the double package, during filling of the foodstuffs into the liner, or during dropping of coupons or premiums inside of the liner, and like operations, is the major cause of improper top sealing. Further, as the top seal is immediately seen when the carton of the double package is initially opened, an improper top seal generates many of the consumer complaints resulting from improperly sealed inner liners. Other defects in the sealing of the liners are improper sealing of the bottom or sides of the liner or holes or tears in the liner itself.

Prior to the present invention, double packages were audited by removing random samples of the double packages at the completion of the packaging operation. It can be appreciated that such audits often did not locate sporadic defective liners because of the relatively small number of samples taken in comparison to the number actually produced and shipped. Further, such audits were often performed at time intervals of 45 minutes or more, such that consistant packaging problems were not noticed or corrected until the audit was performed, potentially resulting in the production of many defective packages. In both cases, defective packages were shipped and ultimately sold to consumers, potentially and justifiably resulting in consumer complaints. Further, as the packaging operation was completed when the audit was performed, the cereal or other foodstuffs in the samples taken could not be reused but were required to be disposed of, resulting in waste of the cereal and foodstuffs even where the samples being tested were properly packaged and marketable before opening.

Accordingly, in the development of the packaging of cereal and other foodstuffs, a need has arisen for testing the liners of double packages to insure that proper sealing has occurred to reduce or practically eliminate the shipment of defective double packages for ultimate sale to the consumer and therefore reduce or practically eliminate consumer complaints resulting from improperly sealed liners inside cartons of the double packages.

Thus, it is an object of the present invention to provide novel apparatus and methods for testing for defective liners in double packages.

Another object of the present invention is to provide such novel apparatus and methods which inspect all packages for defective liners as opposed to only random samples as was performed prior to the present invention.

Yet another object of the present invention is to provide such novel apparatus and methods which allow the ultimate sale of all packages which are tested and found not to include any defects.

Still further, another object of the present invention is to provide such novel apparatus and methods providing immediate feedback so that consistent packaging problems can be located and corrected to minimize the production of defective packages.

SUMMARY

Surprisingly, the above objectives can be satisfied in the field of double packages by providing, in the preferred form, apparatus and methods for testing liners enclosed within a carton of double packages where pressure is placed on the liner through the open top of the carton and the extent of the deflection of the liner under that pressure is detected, with the liner deflecting a greater extent when the liners are improperly sealed allowing the escape of trapped air normally present inside of the sealed liner with the foodstuffs.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
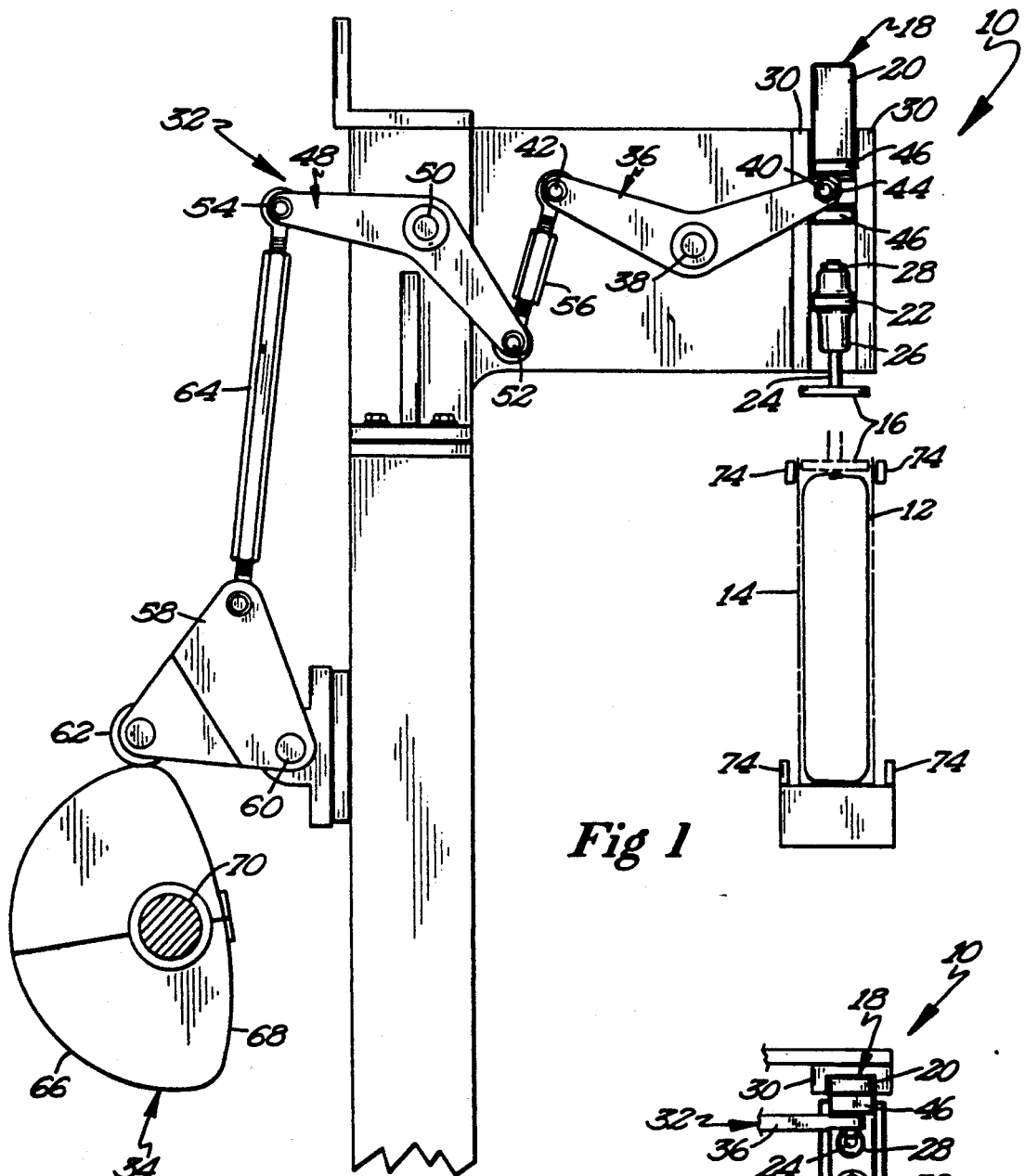
FIG. 1 shows a front plan view of an apparatus for detecting defective liners of a double package according to the preferred teachings of the present invention.
Figure 2:
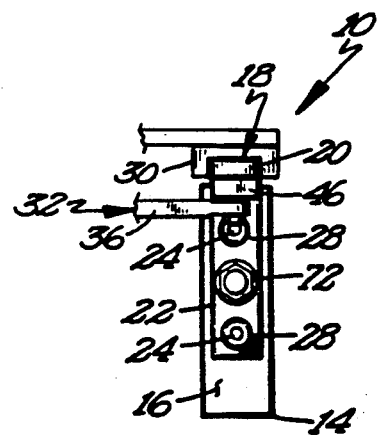
FIG. 2 shows a partial, top view of the apparatus of FIG. 1.
Figure 3:
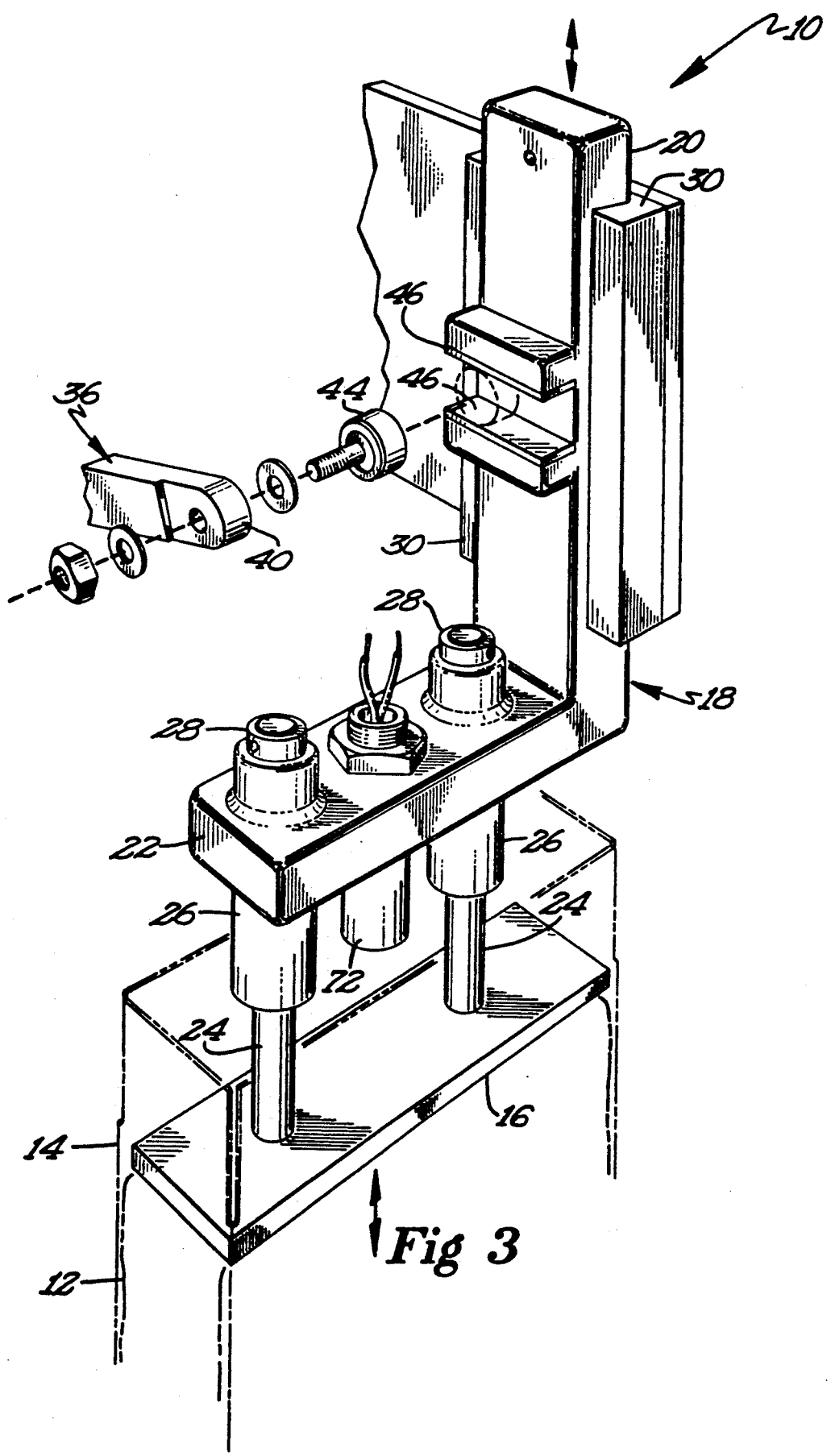
FIG. 3 shows a partial, exploded, perspective view of the apparatus of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "side", "upper", "lower", "horizontal", "vertical", "end", and similar terms are used herein, it should be understood that these terms have reference only to the structure shown in the drawings as it would appear to a person viewing the drawings and are utilized only to facilitate describing the invention.

DESCRIPTION

An apparatus utilizing the present methods for detecting defective liners of a double package according to the preferred teachings of the present invention is shown in the drawings and generally designated 10. Generally, double packages include a sealed liner 12 enclosed within a carton 14, with liner 12 preferably formed of plastic and containing the cereals or other foodstuffs. It can be further appreciated that a volume of air is normally trapped with the foodstuffs in liner 12 when liner 12 is being filled and sealed, with a properly sealed liner 12 retaining this volume of trapped air while improperly or defectively sealed liners 12 allowing the escape of this volume of trapped air. Apparatus 10 according to the preferred teachings of the present invention tests liner 12 after liner 12 has been filled and sealed and just prior to closing and sealing the top flaps of carton 14 such that liner 12 is accessible through the open top of carton 14.

Apparatus 10 includes a pressure plate 16 for extending through the open top of carton 14 for applying pressure on liner 12 within carton 14. It can be appreciated that pressure plate 16 must have an area to pass within the open top of carton 14 and rest upon liner 12 and apply pressure to the top of sealed liner 12 without puncturing liner 12. In the most preferred form, pressure plate 16 has a size approximately ⅛ inch (0.3 centimeters) smaller around the periphery than that of the open top of carton 14. Plate 16 is mounted to a carriage 18 vertically above the open top of carton 14 to float vertically relative to carriage 18 under gravitational forces. In the most preferred form, carriage 18 is L-shaped and includes a vertical leg 20 interconnected to a horizontal leg 22. In the most preferred form, plate 16 is slideably mounted to horizontal leg 22 of carriage 18 for vertical movement. Particularly, plate 16 includes first and second upstanding, vertical, parallel, spaced shafts 24 which are slideably received in the vertical bores of corresponding upstanding, vertical, parallel, spaced bearings 26 extending through horizontal leg 22 of carriage 18. Collars 28 are locked in position on the upper, free ends of shafts 24 to prevent shafts 24 from sliding from and through the vertical bores of bearings 26.

Carriage 18 is reciprocated between a first, lower position adjacent to the double package and a second, upper position elevated from the double package, with the first, lower position and the second, upper position in the preferred form being vertically above and in line with the open top of carton 14. In the most preferred form, carriage 18 is slideably mounted and particularly vertical leg 20 is slideably received in a slide track 30.

In the most preferred form, carriage 18 is reciprocated by a crank arm assembly 32 which is operatively connected to and pivoted by a rotating cam 34 to slide carriage 18 in slide track 30 between the first, lower position and the second, upper position. Particularly, a first crank arm 36 is pivotably mounted about horizontal axis 38 located intermediate its ends 40 and 42. End 40 of crank arm 36 is operatively connected to carriage 18 by a bearing 44 rotatably secured about an axis parallel to and spaced from axis 38 and connected to end 40 and which is reciprocally received in a horizontal track 46 secured and connected to vertical leg 20 of carriage 18. It should be noted that bearing 44 and track 46 allows conversion of the arcuate movement of end 40 about axis 38 to the liner movement of leg 20 within slide track 30.

A second crank arm 48 is pivotably mounted about horizontal axis 50 located intermediate its ends 52 and 54. Axis 50 is parallel to and spaced from axis 38. The ends of a first linkage rod 56 are pivotally connected to ends 42 and 52 of crank arms 36 and 48, respectively.

An actuator arm 58 is pivotally mounted about horizontal axis 60 which is parallel to and spaced from axes 38 and 50. A cam follower 62 is rotatably mounted to arm 58 about an axis spaced from and parallel to axis 60 for rolling engagement with and following cam 34. The ends of a second linkage rod 64 are pivotally connected to end 54 of crank arm 48 and to actuator arm 58 at a point intermediate axis 60 and follower 62. In the most preferred form, actuator arm 58 has the shape of an isosceles triangle, with axis 60 and follower 62 located in the lower two corners and the lower end of linkage rod 64 pivotably connected to the upper corner.

Cam 34 is rotated about a horizontal axis 70 which is parallel to and spaced from axes 38, 50, and 60. In the most preferred form, cam 34 is generally semicircular in shape including a first half 66 having a semicircular periphery and a second half 68 having the shape generally of one half of an ellipse of a width which is substantially less than the radius of the semicircular shape of half 66 of cam 34. It can then be appreciated that as cam 34 rotates about axis 70, follower 62 will roll upon the peripheries of halves 66 and 68. When follower 62 is located on half 66, actuating arm 58 through linkage rod 56 raises end 54 of crank arm 48 and thus lowering end 52 as crank arm 48 pivots or rocks about axis 50. End 52 of crank arm 48 through linkage rod 56 lowers end 42 of crank arm 36 and thus raising end 40 as crank arm 36 pivots or rocks about axis 38. End 40 of crank arm 36 raises carriage 18 to its second, upper position by sliding leg 20 in slide track 30 due to receipt of bearing 44 attached to end 40 in horizontal track 46 secured to leg 20 of carriage 18. On the other hand when follower 62 is located on half 68, actuator arm 58 through linkage rod 56 lowers end 54 of crank arm 48 and thus raising end 52 as crank arm 48 pivots or rocks about axis 50. End 52 of crank arm 48 through linkage rod 56 raises end 42 of crank arm 36 and thus lowering end 40 as crank arm 36 pivots or rocks about axis 38. End 40 of crank arm 36 lowers carriage 18 to its first, lower position by sliding leg 20 in slide track 30 due to receipt of bearing 44 attached to end 40 in horizontal track 46 secured to leg 20 of carriage 18.

Now that the basic construction of apparatus 10 according to the preferred teachings of the present invention has been explained, the operation of apparatus 10 can be set forth and appreciated. Initially, cam 34 is positioned such that follower 62 engages half 66 such that crank arm assembly 32 holds carriage 20 in its second, upper position and with plate 16 held by collars 28 abutting with bearings 26. A double package is then positioned with its open top of carton 14 located vertically below and in line with plate 66 such as by a conveyer. After the double package is positioned below plate 16, the rotational position of cam 34 is such that half 68 is located under follower 62 and crank arm assembly 32 moves carriage 18 toward its first, lower position. As carriage 18 moves toward its first, lower position, plate 16 will extend through the open top of carton 14 and engage, abut, and rest upon liner 12 enclosed by carton 14. Upon continued movement of carriage 18 after plate 16 engages liner 12, plate 16 will be supported by and float relative to carriage 18 under gravitational forces on liner 12, with shafts 24 sliding in bearings 26 raising collars 28 above bearings 26. When carriage 18 reaches its first, lower position, pressure plate 16 puts pressure on liner 12 which in the preferred form is about 2 pounds (750 grams) pressure. In the most preferred form, the pressure on liner 12 is caused by gravity acting on pressure plate 16 to slide pressure plate 16 relative to bearings 26 of carriage 18. A properly sealed liner 12 will hold plate 16 a certain distance from leg 22 of carriage 18 due to the volume of foodstuffs and air enclosed by liner 12. However, in the event that liner 12 is not properly sealed, the pressure of plate 16 will force any air out of liner 12 such that plate 16 may rest generally directly on the foodstuffs of the double package. As the total volume of an improperly sealed liner 12 is reduced by the amount of air which is allowed to escape and which would be normally captured in a properly sealed liner 12, the height of liner 12 in carton 14 is also less for an improperly sealed liner 12 and plate 16 will be located a greater distance from leg 22 of carriage 18 in the event that it is resting on an improperly sealed liner 12. It can then be appreciated that the extent liner 12 deflects under the pressure of pressure plate 16 will be greater for liners 12 which are defectively or improperly sealed allowing the trapped air to escape from liner 12 through such defective or improper seals due to the pressure placed on liner 12 by pressure plate 16 than with liners 12 which are properly sealed and retain the volume of trapped air therein. In fact, if the defective or improper seal is of a large size, liner 12 will allow the immediate escape of all trapped air such that liner 12 will deflect completely upon the foodstuffs contained in liner 12. This extent of deflection or extent of movement of pressure plate 16 relative to carriage 18 as evidenced by the difference of spacing between plate 16 and leg 22 of carriage 18 can be electronically detected or monitored by any suitable means such as by the use of a magnetic sensor 72 secured to leg 22 of carriage 18 where pressure plate 16 is formed of magnetic material and magnetic sensor 72 senses the presence of plate 16 within the range of spacing between plate 16 and leg 22 indicating a properly sealed liner 12. It can then be appreciated that any double packages where plate 16 extends into carton 14 with a spacing from leg 22 of carriage 18 greater than this range and thus indicating that liner 12 is improperly sealed can be removed from the packaging process by any suitable means.

After carriage 18 has been positioned in its first, lower position a sufficient time to allow plate 16 to force out air in any improperly sealed liners 12 which in the preferred form is one third to one half second, the rotational position of cam 34 should be that follower 62 again engages half 66 such that crank arm assembly 32 moves carriage 18 towards its second, upper position. As carriage 18 is raised, shafts 24 slide in bearings 26 until collars 28 engage bearings 26. Upon continued raising of carriage 18, plate 16 is also raised with carriage 18 and is withdrawn from carton 14 when carriage 18 is located in its second, upper position. When carriage 18 is located in its second, upper position, the tested double package may be moved such as by the conveyer and the next double package may be positioned under plate 16 when the operation may be repeated for that double package.

It should be noted that side plates 74 may be placed along side of carton 14 to prevent the double package from deflecting or tipping over under pressure from pressure plate 16.

It can then be appreciated that apparatus 10 according to the teachings of the present invention allows 100% inspection of all double packages being produced. As all packages are inspected, the number of defective packages which are ultimately sold can be greatly minimized, with defective rates of less than one-half percent being obtained. This minimization and practical elimination of the sale of defective packages will also minimize the number of consumer complaints and increase the goodwill of the product in the eyes of the consumer. Further, as defects are immediately found, it is possible to take any corrective action to eliminate the production of such defects in later packages. Prior to the present invention, consistent defects were often initially discovered by the consumer and only after the production, shipment, and potential sale of many such defective packages, were faults noticed and corrective action taken. It can be appreciated that any cereal or other foodstuffs contained in such defective packages or suspected defective packages was often destroyed, resulting in waste and higher costs. Further, as the testing with apparatus 10 according to the teachings of the present invention occurs prior to closing of the top of carton 14, it is no longer necessary to dispose of the tested products which was previously required in prior audit methods where it was necessary to open the cartons of the audited package to determine whether or not defects existed in the liners of the double package, thus requiring disposal of the package and the contained foodstuffs even though no defects were found in that audit. Thus, waste of cereal or other foodstuffs is further reduced utilizing apparatus 10 according to the preferred teachings of the present invention. It can also be appreciated that crank arm assembly 32 is advantageous in that the downward movement of carriage 18 and plate 16 carried thereby occurs under gravitational forces, with cam 34 controlling the extent that carriage 18 is lowered. Specifically, an upward force is placed on carriage 18 by follower 62 of crank arm assembly 32 moving on half 66 of cam 34 to move carriage 18 from the first, lower position to the second, upper position. On the other hand, the upward force is removed from carriage 18 when follower 62 of crank arm assembly 32 moves on half 68 of cam 34 allowing carriage 18 to fall under gravitational forces from the second, upper position to the first, lower position. Therefore, if an object such as an operator's limb should be inserted between the double package and side plates and carriage 18 and plate 16, such object would be subjected only to such gravitational forces and specifically would not be subjected to a camming force pushing carriage 18 and plate 16 downward as may occur if only a single crank arm were utilized.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An apparatus for testing liners enclosed within a carton of a double package, with the liners being sealed and containing a product and a volume of trapped air, with the carton having an open top through which the liner is accessible, comprising, in combination: a pressure plate of a size substantially equal to but slightly smaller than the open top of the carton for extending through the open top of the carton; a carriage including a horizontal leg; means for slideably mounting the pressure plate to float relative to the carriage, with the pressure plate located vertically above the open top of the carton and being movable vertically, with gravity acting on the pressure plate placing gravitational pressure on the liner within the carton; and means for detecting the extent of movement of the pressure plate relative to the carriage with the liner under the gravitational pressure of the pressure plate deflecting a greater extent when the liners are improperly sealed allowing escape of the trapped air from the liner; and wherein the means for slideably mounting the pressure plate relative to the carriage comprises, in combination: a vertical shaft connected to the pressure plate; a vertical bore extending through the horizontal leg of the carriage for slideably receiving the vertical shaft of the pressure plate; and means for preventing the vertical shaft from sliding from the vertical bore of the carriage.

2. The testing apparatus of claim 1 wherein the detecting means comprises a magnetic sensor, with the pressure plate formed of magnetic material.

3. The testing apparatus of claim 1 further comprising, in combination: means for reciprocating the carriage between a first, lower position adjacent the open top of the carton and a second, upper position elevated from the open top of the carton, with the pressure plate slideably mounted to the carriage engaging the liner in the first, lower position and positioned above the open top of the carton in the second, upper position.

4. The testing apparatus of claim 3 wherein the reciprocating means comprises, in combination: means for slideably mounting the carriage for slideable movement between the first, lower position and the second, upper position; and means for sliding the carriage between the first, lower position and the second, upper position.

5. An apparatus for testing sealed liners containing a product and a volume of trapped air, comprising, in combination: a carriage; a first crank arm having at least a first end, with the first crank arm being pivotally mounted about an axis; means for rocking the first crank arm about its axis; means for operatively connecting the first end of the crank arm to the carriage for moving the carriage between a first, lower position adjacent the liner and a second, upper position elevated from the liner; means movable relative to the carriage for placing pressure on the liner; and means for detecting the extent the liner deflects under the pressure placing means, with the liner deflecting a greater extent when the liners are improperly sealed allowing escape of the trapped air from the liner.

6. The testing apparatus of claim 5 wherein the operatively connecting means comprises, in combination: a bearing rotatably secured about an axis parallel to and spaced from the axis of the first crank arm; and a horizontal track for rolling receipt of the bearing, with the bearing being connected to one of the first end of the first crank arm and the carriage and the horizontal track being connected to the other of the first end of the first crank arm and the carriage.

7. The testing apparatus of claim 6 wherein the rocking means comprises, in combination: a cam rotatably mounted about an axis which is parallel to and spaced from the axis of the first crank arm, with the first crank arm having a second end; and means operatively connected to the second end of the first crank arm for following the cam.

8. The testing apparatus of claim 7 wherein the following means comprises, in combination: a second crank arm having a first end and a second end, with the second crank arm being pivotally mounted about an axis parallel to and spaced from the axis of the first crank arm; and a first linkage rod having a first end and a second end, with the first end of the first linkage rod being pivotally connected to the second end of the first crank arm, with the second end of the first linkage rod being pivotally connected to the first end of the second crank arm.

9. The testing apparatus of claim 8, wherein the following means comprises, in combination: an actuator arm pivotally mounted about an axis parallel to and spaced from the axis of the second crank arm; a second linkage rod having a first end and a second end, with the first end of the second linkage rod being pivotally connected to the second end of the second crank arm, with the second end of the second linkage rod being pivotally connected to the actuator arm spaced from the axis of the actuator arm; and a follower located on the actuator arm spaced from the axis of the actuator arm for following on the cam.

10. The apparatus of claim 5 wherein the detecting means comprises a magnetic sensor.

11. The apparatus of claim 5 wherein the pressure placing means comprises means for placing gravitational pressure on the liner.

12. An apparatus for testing sealed liners containing a product and a volume of trapped air, comprising, in combination: a carriage movable between a first, lower position adjacent the liner and a second, upper position elevated from the liner; wherein the carriage includes a horizontal leg; a pressure plate; a vertical shaft connected to the pressure plate; a vertical bore extending through the horizontal leg of the carriage for slideably receiving the vertical shaft of the pressure plate; means for preventing the vertical shaft from sliding from the vertical bore of the carriage, with the pressure plate slideably mounted to the carriage engaging the liner in the first, lower position for placing pressure on the liner and positioned above the liner in the second, upper position; and means for detecting the extent the liner deflects under the pressure plate, with the liner deflecting a greater extend when the liners are improperly sealed allowing escape of the trapped air from the liner.

13. The testing apparatus of claim 12 wherein the detecting means comprises a magnetic sensor, with the pressure plate formed of magnetic material.

14. The testing apparatus of claim 12 wherein the pressure abuts with a face of the liner, with the pressure plate being of a size substantial to the face of the liner with which the pressure plate abuts.

15. The testing apparatus of claim 14 wherein the pressure plate is located vertically above and movable vertically relative to the liner, with gravity acting on the pressure plate placing pressure on the liner.

16. The testing apparatus of claim 15 further comprising, in combination: a carriage; means for slideably mounting the pressure plate to float relative to the carriage; means for reciprocating the carriage between a first, lower position and a second, upper position, with the pressure plate slideably mounted to the carriage engaging the liner in the first, lower position and positioned above the liner in the second, upper position.

17. The testing apparatus of claim 16 wherein the reciprocating means comprises, in combination: means for slideably mounting the carriage for slideable movement between the first, lower position and the second, upper position; and means for sliding the carriage between the first, lower position and the second, upper position.

18. The testing apparatus of claim 17 wherein the sliding means comprises, in combination: a first crank arm having at least a first end, with the first crank arm being pivotally mounted about an axis; means for rocking the first crank arm about its axis; and means for operatively connecting the first end of the crank arm to the carriage.

19. The testing apparatus of claim 18 wherein the operatively connecting means comprises, in combination: a bearing rotatably secured about an axis parallel to and spaced from the axis of the first crank arm; and a horizontal track for rolling receipt of the bearing, with the bearing being connected to one of the first end of the first crank arm and the carriage and the horizontal track being connected to the other of the first end of the first crank arm and the carriage.

20. Method of testing liners enclosed within a carton of a double package, with the liners being sealed and containing a product and a volume of trapped air, with the carton having an open top through which the liner is accessible, comprising the steps of:
 a) providing a carriage including a horizontal leg; a pressure plate; a vertical shaft connected to the pressure plate; a vertical bore extending through the horizontal leg of the carriage for slideably receiving the vertical shaft of the pressure plate; and means for preventing the vertical shaft from sliding from the vertical bore of the carriage;
 b) reciprocating the carriage between a first, lower position adjacent the liner and a second, upper position elevated from the liner, with the pressure plate slideably mounted to the carriage engaging the liner in the first, lower position placing gravitational pressure on the liner through the open top of the carton and positioned above the liner in the second, upper position; and
 c) detecting the extent of deflection of the liner under gravitational pressure, with the liner deflecting a greater extent when the liners are improperly sealed allowing escape of the trapped air from the liner.

21. The method of claim 20 wherein the step of detecting the extent of deflection of the liner comprises the step of detecting the extent of movement of the pressure plate.

22. The method of claim 21 wherein the step of detecting the extend of movement of the pressure plate comprises the step of magnetically sensing the presence of the pressure plate within the range of movement indicating a properly sealed liner.

23. The method of claim 20 wherein the step of reciprocating the carriage comprises the steps of: sliding the carriage between the first, lower position and the second, upper position, with the first, lower position and the second, upper position being vertically above and in line with the open top of the carton.

24. The method of claim 23 wherein the step of sliding the carriage comprises the steps of placing an upward force on the carriage to move the carriage from the first, lower position to the second, upper position; and removing the upward force on the carriage allowing the carriage to fall under gravitational forces from the second, upper position to the first, lower position.

* * * * *